United States Patent [19]

Bühler

[11] 4,232,208
[45] Nov. 4, 1980

[54] APPARATUS AND METHOD FOR ELECTRICAL DISCHARGE MACHINING

[75] Inventor: Ernst Bühler, Tenero, Switzerland

[73] Assignee: A.G. für industrielle Elecktronik AGIE Losone b. Locarno, Losone, Switzerland

[21] Appl. No.: 936,027

[22] Filed: Aug. 25, 1978

[30] Foreign Application Priority Data

Mar. 6, 1978 [CH] Switzerland .................. 2419/78

[51] Int. Cl.³ ............................................. B23P 1/12
[52] U.S. Cl. .................................... 219/69 W; 83/74; 219/69 M
[58] Field of Search ............... 219/69 W, 69 M, 69 R; 318/561; 324/71 R; 83/72, 74

[56] References Cited

U.S. PATENT DOCUMENTS

| | | | |
|---|---|---|---|
| 3,731,043 | 5/1973 | Ullmann et al. | 219/69 W |
| 4,052,584 | 10/1977 | Reznicek | 219/69 W |
| 4,131,837 | 12/1978 | Whetham | 318/561 |

*Primary Examiner*—B. A. Reynolds
*Assistant Examiner*—Clifford C. Shaw
*Attorney, Agent, or Firm*—Frishauf, Holtz, Goodman & Woodward

[57] ABSTRACT

The disclosed method involves generating cartesian coordinate information representative of the electrode deflection from a rest position of a wire electrode electrical discharge cutting machine, feeding this information into an electronic processing system to convert it to appropriate control instructions, and then feeding the instructions into a drive system, which can then correct the relative positions of the wire electrode and the workpiece accordingly, so that the deflection of the wire electrode does not adversely influence the configuration of the cut made in the workpiece by it.

The apparatus for performing the method comprises a wire electrode position pickup system, which can be a photoelectric system picking up the shadow of the wire or a system which measures the spacing between the wire and sensing electrodes by sensing the electrolytic current through a dielectric fluid which fills the space between them. The deflection information representative of the deflection is then fed as an input signal into an electronic processing unit which for each coordinate includes an analog computer with a summator, an inverter with amplification of one-half, a differentiator, and a division circuit to convert it to control instructions for a drive unit which makes the positional correction. The correction can be made by the main drive unit which moves the workpiece or by an auxiliary drive which moves the wire guides relative to the wire guide supporting structure.

13 Claims, 11 Drawing Figures

APPARATUS AND METHOD FOR ELECTRICAL DISCHARGE MACHINING

BACKGROUND OF THE INVENTION

The invention relates to a method for electrical discharge machining according to the wire cutting principle. This method and the apparatus used with it can in particular be employed where extremely accurate cutting contours are required at the maximum working speed.

Of late, so-called short-duration pulse generators have been used as working pulse sources in wire cutting and have led to considerable advances with regard to the working speed (e.g. described in U.S. Patent Application Ser. No. 825,036) now U.S. Pat. No. 4,163,887, Buhler et al, assigned to the assignee of this application).

Although with this type of generator vibrations on the wire electrode can be eliminated, the greatly increased working forces cause a permanent deflection of the wire electrode, which is sensitive to bending. This deflection, which is in the direction opposite to the working direction, causes significant contour errors when cutting curved contours.

A temporary, uncontrolled deflection of the wire electrode may also be brought about by other forces, caused for example by gas bubbles in the dielectric, or turbulent flows thereof, or material stresses in the actual wire electrode.

Influencing of the cutting contour by deflection of the wire electrode must be prevented.

One approach to this problem is described in Japanese Pat. No. 119,393/74, which proposes a theoretical determination of the deflection by calculation and its compensation by means of a numerical control system. However, although this method may be satisfactory for straight cutting contours, serious problems occur in the case of a curved cutting contour because it is not possible to calculate the path of the deflection from one axial direction to the other. Therefore, this method is not practical.

Another approach to this problem is disclosed in DE-OS 2,635,766, to which U.S. Pat. No. 2,635,766 corresponds, which proposes reducing the generator output and the working speed in proportion to the increased curvature of the cutting contour. However, this has the disadvantage of very considerable cutting efficiency losses in the case of frequently curved cutting contours, while the error is only partly compensated.

Still another approach is proposed in GB Pat. No. 1,512,654, to which U.S. Pat. No. 4,104,502, assigned to the assignee of this application, corresponds, where the wire electrode is subjected to the action of additional currents and additional voltages in order to provide compensation by means of electro-magnetic and electro-static forces acting on the wire electrode. Unfortunately, this leads to additional loading of the wire electrode by electric heat and arc discharges, which once again brings about cutting efficiency losses. Furthermore, the electromagnetic forces are only active with ferromagnetic workpieces.

None of these three approaches is able to obviate faults caused by gas bubbles and turbulent flows in the dielectric or caused by material stresses in the wire electrode.

It is an object of the present invention to obviate the above-described contour errors and thereby significantly increase the precision of the wire cutting method without having to accept losses in the working speed.

DETAILED DESCRIPTION OF THE PREFERRED EMBODIMENTS

Figure 1:
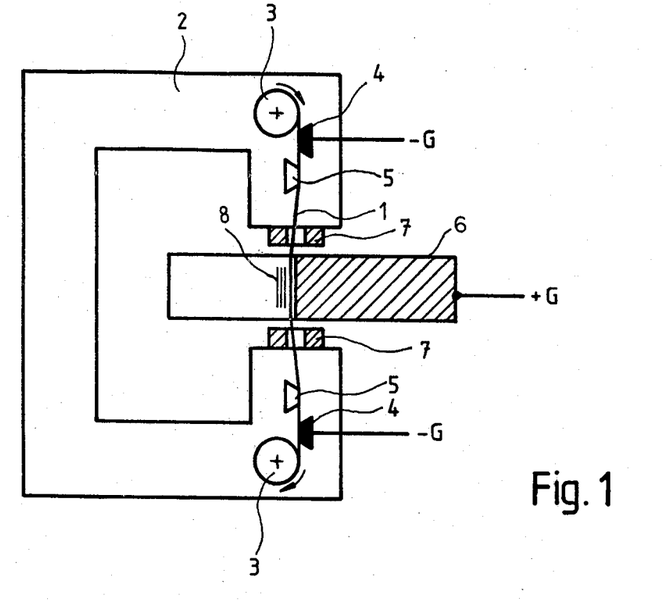
FIG. 1 is a schematic, partially sectioned side view of a wire cutting machine in accordance with a preferred embodiment of the present invention.
Figure 2:
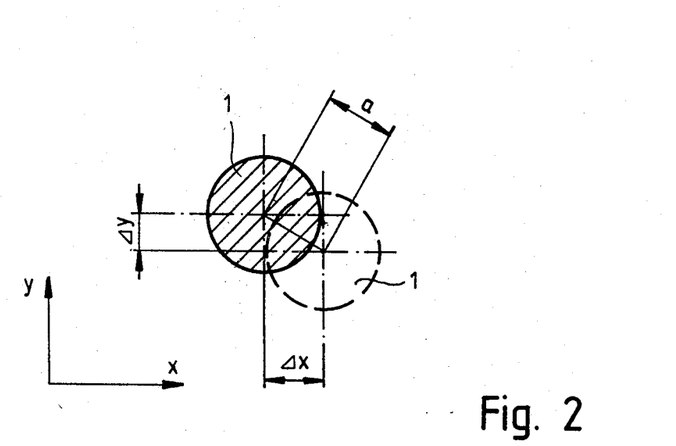
FIG. 2 is a diagrammatic cross-sectional view of a wire electrode of the machine of FIG. 1 in a deflected position.

According to the present invention, with reference to FIG. 1 of the drawings, the deflection of the wire electrode 1 with respect to the rest position is measured by at least one displacement pickup system 7 located between a wire guide 5 and the workpiece 6 around the wire electrode 1. With the aid of the deflection information $\Delta X$, $\Delta Y$, as shown in FIG. 2, the feed path is constantly corrected in such a way that wire electrode 1 is always positioned on the prescribed path.

Figure 10:
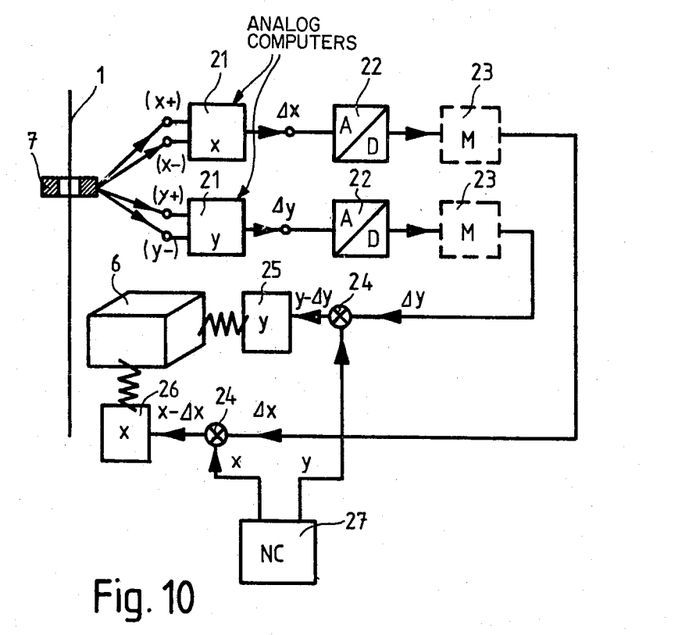
FIG. 10 is a functional schematic diagram of the operation of a wire electrode path correction system of the machine of FIG. 1 which corrects via the main drive positioning drive of the machine.

The correction of the feed path is achieved in such a way that a control instruction $X - \Delta X$, $Y - \Delta Y$ formed from the desired position X and Y and the deflection $\Delta X$, $\Delta Y$ subtracted therefrom is supplied to the X, Y main axial drive 25, 26, as shown in FIG. 10. The term "axial" in this regard means along X or Y cartesian coordinate axes.

Figure 11:
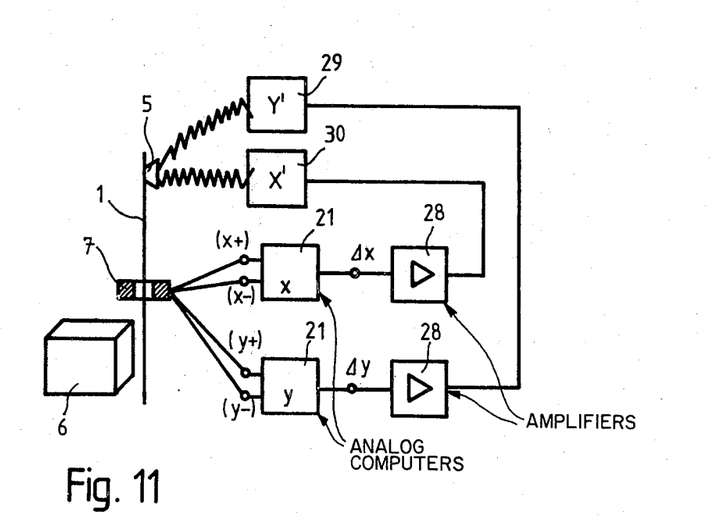
FIG. 11 is a functional schematic diagram of the operation of a wire electrode path correction system of the machine of FIG. 1 which corrects via an auxiliary axial drive.

The correction of the feed path is also achieved in such a way that via a control amplifier 28, as shown in FIG. 11, and an X-Y auxiliary axial drive 29, 30 the wire guide 5 is corrected relative to guide arm 2 (FIG. 1) until the displacement pickup, which is fixed to the guide arm 2, no longer detects a deflection error $\Delta X$, $\Delta Y$.

The method for the currentless positioning and alignment of the wire electrode 1 is utilized in that the electrode 1 is moved towards an electrically conductive or non-conductive reference surface until the displacement pickup system 7 indicates a deflection error ΔX, ΔY and is subsequently moved in the opposite direction until the deflection error ΔX, ΔY again assumes a zero value.

Figures 4, 5:
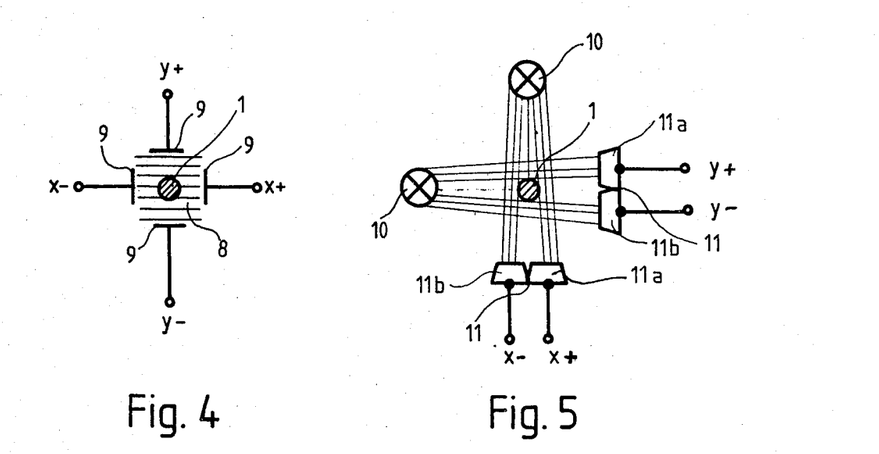
FIG. 4 is a diagrammatic cross-sectional view of a wire electrode displacement pickup system of the electrolytic type for the machine of FIG. 1.
FIG. 5 is a diagrammatic cross-sectional view of a wire electrode displacement pickup system of the light sensor type for the machine of FIG. 1.

The displacement pickup system 7 for obtaining deflection information ΔX, ΔY, as shown in FIG. 4, comprises four test electrodes 9 arranged in crosswise manner about wire electrode 1 in the X, Y main axial direction, while the dielectric 8 supplied to the working zone constantly flows around the arrangement. An a.c. voltage source is applied between wire electrode 1 and each of the test electrodes 9 and the alternating currents flowing between the wire electrode 1 via dielectric 8 and test electrodes 9 are rectified and measured by means of absolute value formers 14 of FIG. 6.

Another type of displacement pickup system 7 is shown in FIG. 5. It comprises in each one light source 10 and a double light sensor 11 located in respective x and y directions, as shown in FIG. 5, arranged around wire electrode 1 in such a way that in the case of a non-deflected electrode 1, an equally wide shadow zone is formed on both sensor halves 11a, 11b of the double light sensors 11, and in the case of a deflected electrode 1 the shadow zone is enlarged to the same extent on one sensor half 11a as it is reduced on the other sensor half 11b. The consequently changed output signals of double light sensors 11 are measured and amplified by means of amplifiers 16.

The output signals $|X+|$, $|X-|$, $|Y+|$, $|Y-|$ of the displacement pickup system 7 are in each case further processed by an analog computer 21 (FIGS. 8, 10, 11), each of which comprises (FIG. 8) a summator 18, an inverter 19 with amplification 0.5, a differentiator 17, and a division circuit 20. The average value of the positive and negative components of each axial direction X, Y is calculated by means of summator 18 and inverter 19 and in differentiator 17. The average value is subtracted from the positive component and, finally, the value is divided by the average value in the division circuit 20.

For the further processing of the output signals ΔX, ΔY of the analog computers 21, the signals are quantized by means of analog-digital converters 22 (FIG. 10).

The quantized output signals of the analog-digital converter 22 are fed to the address inputs of the read-only memory 23. Each storage location of read-only memory 23 contains an optionally corrected value for the deflection of the wire electrode 1, and consequently compensates a non-linearity of the displacement pickup system 7.

The analog computers 21 and control amplifiers 28 (FIG. 11) for each axial direction X, Y are connected behind the displacement pickup system 7. The control amplifiers 28 control the auxiliary axial drives 29, 30 in such a way that wire guide 5, and consequently wire electrode 1, are so displaced relative to the displacement pickup system 7 that deflection errors ΔX, ΔY seek to reach the zero value.

The advantages obtainable with the invention are that each deflection or displacement of the wire electrode 1 can be accurately determined without undesired feedback and a correction thereof can be automatically performed in a simple way. Even in the case of greatly curved cutting contours, there is no need to reduce the maximum possible working speed. Furthermore, the invention makes it possible for the first time to currentlessly position the wire electrode relative to reference surfaces of the workpiece or on wire alignment devices without galvanic contact. Thus, a greater positioning accuracy without damaging the workpiece or wire alignment device is achieved.

FIG. 1 shows the wire cutting arrangement according to the invention. In a generally known manner, wire electrode 1 is unwound from a first wire bobbin 3 under tensile stress, passes through the working zone in workpiece 6 and is wound onto a second wire bobbin 3. The dielectric 8, which for wire cutting is generally a treated water with a conductance of 1 to 100 μS/cm, is passed into the working zone. The working pulses supplied by the generator +G, −G are applied between workpiece 6 via contacts 4 and wire electrode 1. The function of wire guides 5 is to maintain wire electrode 1 in a clearly defined position. In general, wire bobbins 3, contacts 4, and guides 5 are mounted on a guide arm 2. This complete arrangement performs a movement relative to workpiece 6 in accordance with the desired cutting contour.

Despite the maximum possible tensile stress applied to wire electrode 1, depending on the working forces, the latter remains deflected between about 5 and 100 μm in the indicated manner. An upper and possibly a lower displacement pickup system 7 is used to determine this displacement or deflection. The lower displacement pickup system is particularly applicable when the correction of the feed path is achieved by means of a control amplifier and an auxiliary axial drive for a wire guide, the auxiliary axial drive correcting the position of the wire guide relative to the guide support structure until the displacement pickup system, which is fixed to the support structure, no longer detects a deflection error. The displacement pickup systems 7 are also fixed to guide arm 2.

FIG. 2 shows wire electrode 1 in greatly enlarged cross-sectional form. The dotted outlines indicate the rest position of wire electrode 1, while the solid-line outlines indicate its position under loading by working forces. Wire electrode 1 is displaced by amount a in some direction, and the problem therefore exists of measuring and correcting this displacement error by components ΔX, ΔY in the X and Y main axial direction.

Figure 3:
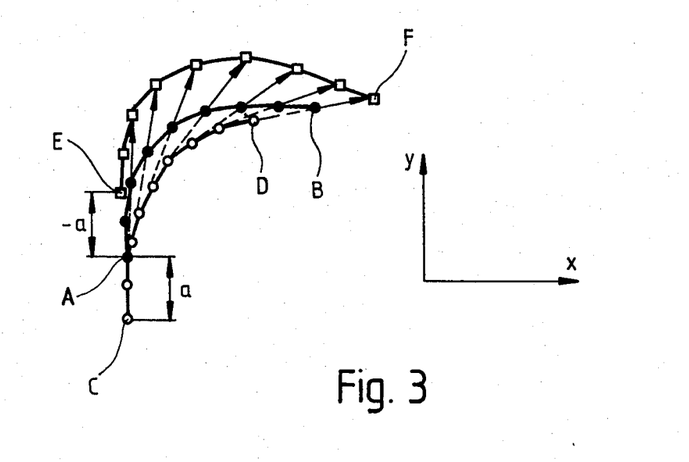
FIG. 3 is a graphical representation of a curved path contour, such as that which the electrode of FIG. 2 is to follow.

FIG. 3 shows by means of a given curved path A-B what happens when there is a displacement a. If no correction takes place, the cut contour is formed on the significantly displaced path C-D. According to the invention, the wire guides 5 perform a corrected path E-F, which at all times differs from the measured quantity −a or its components −ΔX and −ΔY by the prescribed path. The contour cut in workpiece 6 is consequently identical with the desired path A-B.

FIG. 4 illustrates a particularly suitable measuring method for the displacement pickup system 7. This method is known for conductivity measuring cells for liquids. An alternating voltage is applied between two electrodes and conclusions are drawn regarding the conductance by means of the measured current and the mechanical dimensions of the cell.

The basic relationship is:

$$\eta = \frac{l}{R \cdot A}$$

η : conductance in μS/cm
l : length of measured liquid column in cm
A : cross-section of measured liquid column in cm²

| | |
|---|---|
| R : | resistance in MΩ determined from the voltage and current. |

In the arrangement according to the invention, there are four measuring cells and conclusions are drawn regarding the length 1 and not regarding the conductance.

Wire electrode 1 serves as a common electrode for all four measuring cells and around which four test electrodes 9 are provided in crosswise manner in the main axial directions X+, X−, Y+, Y−. The treated dielectric with a conductance of 1-100 μS/cm flows through the whole arrangement. The geometry of the cells is selected in such a way that for the given range of conductance and displacements of wire electrode 1 of approximately 5 to 100 μm, resistances R approximately in the range 100Ω and 1 MΩ will be measured.

Figure 6:
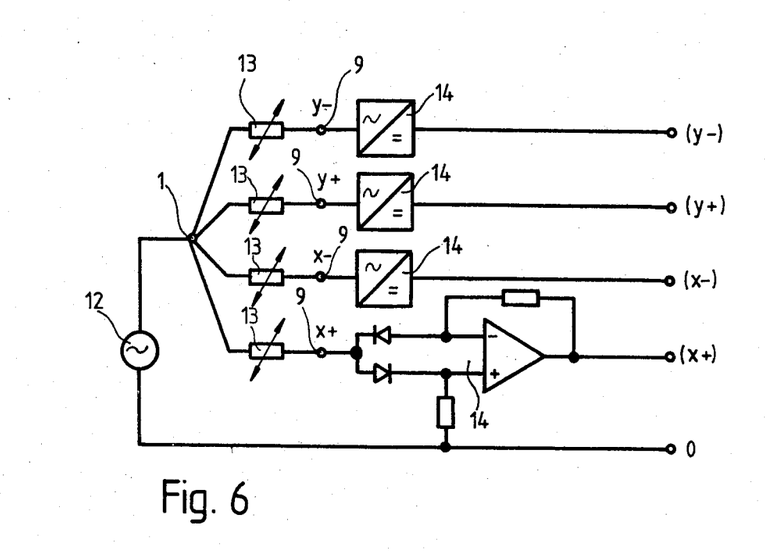
FIG. 6 is a schematic circuit diagram for a sensing system of the type of FIG. 4.

FIG. 6 illustrates a suitable measurement circuit for the arrangement of FIG. 4. An a.c. voltage source 12 of, for example, 10 V r.m.s. value and for example with a line frequency of 50 or 60 Hz is supplied by means for current supply 4 or similar means to wire electrode 1 and by means of in each case one absolute value former 14 is supplied to the four test electrodes 9. An a.c. voltage must be used in order to produce no electrolytic effects, such as corrosion and wear to wire electrode 1 and test electrodes 9. The frequencies and voltage configurations used are of secondary importance, but the symmetry of the a.c. voltage is important. The r.m.s. value of the a.c. voltage source 12 could for example be adapted to the conductivity of the dielectric, in order not to overdrive analog computer 21 according to FIG. 8. The function of absolute value formers 14 is to rectify the alternating currents flowing across the varying resistors 13 of the measuring section and transform them into voltage signals. Thus, the four output signals $|Y-|$, $|Y+|$, $|X-|$, $|X+|$ only assume positive values. With regard to the absolute value former 14 reference is made to the book of McGraw-Hill publishing company Düsseldorf/New York: Applications of Operational Amplifiers 1973 by Jerald Graeme, page 127; a schematic abbreviated circuit diagram is illustrated with respect to the X+ test electrode.

FIG. 5 shows another very suitable measuring method for the displacement pickup system 7. A light-source 10 and a double light sensor 11 for each main axial direction X, Y are arranged around wire electrode 1 in such a way that the shadow caused by electrode 1 uniformly covers sensor halves 11a, 11b in the rest position. In the deflected position, the asymmetry of the shadow causes a corresponding asymmetry of the lighting intensity on the two sensor halves 11a, 11b and consequently a corresponding change to their output signals. The light source 10 may comprise bulbs or preferably light-emitting diodes. The double light sensor 11 can for example be a double photo diode of type STDD-210 of Sensor Technology, Chatsworth, California, USA. This component contains two photodiodes only 20 μm apart. As is known, with photodiodes by measuring the inverse current with voltage applied in the inverse direction conclusions can be drawn on the lighting intensity. This arrangement also provides the possibility of operating light sources 10 in a pulsed manner, for example with a frequency of 1 to 100 kHz and then only evaluating the alternating current component of the double light sensors. This increases the security against disturbances and interference.

Figure 7:
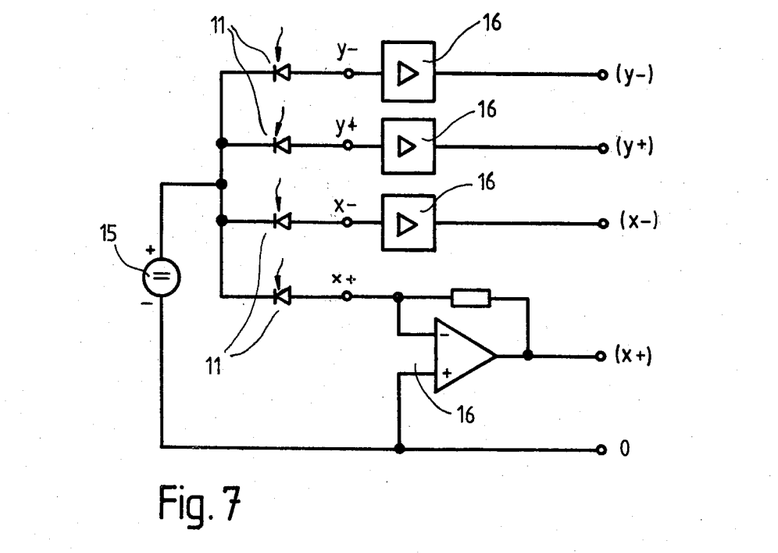
FIG. 7 is a schematic circuit diagram for a sensing system of the type of FIG. 5.

FIG. 7 shows a solution of how measurement can take place according to the light sensor method. A d.c. voltage source 15 of for example 20 V subjects the photo diodes of the double light sensors 11 to the action of an inverse current. In accordance with the lighting intensity from outputs X+, X−, Y+, Y− flow the inverse currents of the photodiodes amplified by means of amplifier 16 and converted into analog voltage signals $|X+|$, $|X-|$, $|Y+|$, $|Y-|$. In principle, these signals are of the same type as in FIG. 6 and both can be further processed in analog computer 21.

Figure 8:
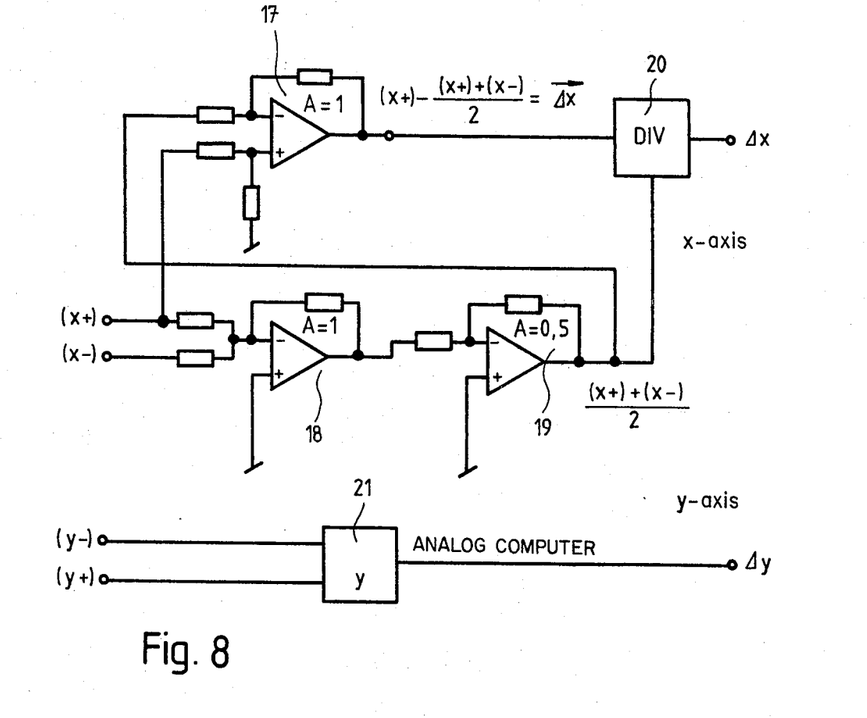
FIG. 8 is a schematic circuit diagram for an analog computer for processing into analog voltage signals the signals from the sensing systems of the circuits of FIGS. 6 and 7.

FIG. 8 illustrates the analog computer detailed for the X axis and represented as a block for the Y axis. The function of analog computer 21 is to so prepare the measured values that influences such as the conductance of dielectric 8, the diameter of wire electrode 1, the intensity of light source 10, the aging of the double light sensors, contamination, temperature and the like are eliminated. This is achieved in that the average value of the two absolute values $|X+|$, $|X-|$ of each axial direction is calculated, said average value is subtracted from the absolute value in the positive axial direction $|X+|$ and the positive or negative quantity obtained is related to the previously calculated average value. Reference can be made in this connection to a relative error ΔX which can vary from −1 to +1. Using a constant (e.g. 100 μm) determined by calibration, the actual deflection ΔX in μm can be found by multiplying with the relative error. As it is in any case possible to operate with voltage levels, e.g. −10 V to +10 V, said constant is unnecessary, it being merely necessary to ensure that the total amplification of the measuring arrangement and analog computer is adjusted in such a way that the analog-digital converter 22 in FIG. 10 supplies the digital value corresponding to the deflection or displacement.

Figure 9:
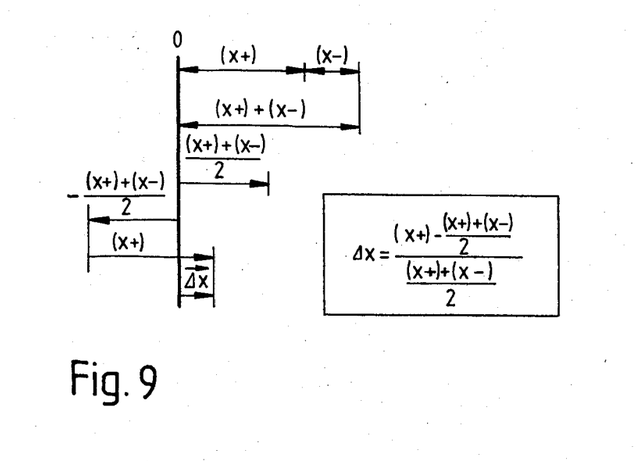
FIG. 9 is an operational diagram for the analog computer having the circuit of FIG. 8.

FIG. 9 shows a graphical representation of the calculation process for the X axis. The absolute values $|X+|$ and $|X-|$ are obtained at the inputs and are summated in a summator 18 of FIG. 8. As this summator inverts, an inverter 19 is connected behind it which, due to its amplification A=0.5, simultaneously divides the sum by 2, which gives the arithmetic means of $|X+|$ and $|X-|$. This average value is subtracted from the absolute value $|X+|$ in a differentiator 17. (In the diagram of FIG. 9 by reversing the direction of the mean value $|X+|+|X-|/2$ and summating to the absolute value $|X+|$). This leads to the component ΔX, which can assume positive or negative values, but still has the various disturbing or interfering influences described, which are suppressed by dividing in the division circuit 20. At the output, component ΔX is obtained as a positive or negative value, which behaves proportionally to the sought component ΔX of the deflection error. Assuming that these disturbing influences act uniformly on absolute values $|X+|$ and $|X-|$ during division, they occur in the numerator and in the denominator and can therefore be shortend. An identical analog computer 21 is provided for the Y direction. For the explanation of the circuits used, i.e. differentiator 17, summator 18 and inverter 19, reference is made to the book "Electronics for Engineers" of the Cambridge University Press, England, 1973 pp. 120–123 and 111, while for the division circuit 20 reference is made to RCA Handbook 1975 "Linear Integrated Circuits" No. SSD-201C, pp. 449 and 450.

FIG. 10 shows the diagrammatic arrangement for the correction via the main axial drive 25, 26. The term "main axial drive" is understood to mean the feed system, which in a generally known manner performs the relative movement between wire electrode 1 and workpiece 6 predetermined by the numerical control system 27. The deflection of wire electrode 1 measured by the displacement pickup system 7 is supplied by analog computer 21 in components ΔX and ΔY of the deflection error. By means of analog-digital converter 22 this analog deflection information ΔX is for example quantized with an 8 bit resolution. Thus, for example, 256 gradations of in each case 1 μm with sign are made available. Thus, the maximum measurable deflection of wire electrode 1 is 255 μm in all directions.

A possible non-linear behaviour of displacement pickup system 7 can easily be compensated by means of the read-only memory 23 in that a correct value in the corresponding storage location is associated with each distorted digital value of output signals ΔX, ΔY of analog-digital converter 22. The correct values can be determined by calibration. The read-only memory can for example be an 8×8 bit PROM (Programmable "read-only memory").

In signal connection point 24 ΔX or ΔY is subtracted from the desired value X or Y of the deflection error and the thus modified values X−ΔX or Y−ΔY are fed to the X main axial drive 25 and the Y main axial drive 26. The signal connection point 24 is of a symbolic nature and could e.g. comprise a digital, wired-in computer logic or more probably comprises a small subprogram in a normally existing programmable computer of the numerical control system 27.

In this connection, it is pointed out with the aid of presently existing technologies such as microprocessors, multiplexers, etc. the problem of measured value preparation 21, 22, 23, 24 can be solved on a purely software basis, i.e. only by programming a computer. The four outputs |X+|, |X−|, |Y+|, |Y−| of the displacement pickup system 7 are then interrogated by an analog-digital converter 22 in the time-multiplex operation and the digital values are supplied to a programmable computer. The latter then digitally prepares the described measured values and feeds signals X−ΔX and Y−ΔY to drives X, Y, 25, 26.

FIG. 11 shows the diagrammatic arrangement for a correction by means of an auxiliary axial drive 29, 30. Apart from the known relative movements of the workpiece 6 relative to wire electrode 1 by main axial drive 25, 26 an additional small auxiliary axial drive 29, 30 is provided, which can adjust the now movably arranged wire guide 5 relative to guide arm 2 in axial directions X and Y by for example ±200 μm. The displacement pickup system 7 is fixed to guide arm 2 and measured value preparation is effected by analog computers 21 of FIG. 10. However, the analog deflection information ΔX, ΔY is supplied to the control amplifiers 28, which supply corresponding control signals to the X auxiliary axial drive 30 and the Y auxiliary axial drive 29. Thus, wire guide 5 and consequently wire electrode 1 are adjusted in such a way that the deflection error becomes smaller and the deflection information ΔX, ΔY seek to reach the value zero.

Control amplifier 28 is advantageously given a so-called PI control behaviour, i.e. its output signal is proportionally and integrally dependent on its input signal ΔX or ΔY. (Reference is made to the book "Halbleiter-schaltungstechnik" U. Tietze, Springer-Verlag, New York 1971, pp. 232). As a result, a sudden change in the input signal ΔX, ΔY will result in by a corresponding sudden change at the output a very small, but very long input signal will result in maximum amplification being supplied to the output. Thus is it possible to correct the position of wire electrode 1 with optimum rapidity and accuracy. The arrangement of FIG. 10 admittedly has the minor defect that, since the displacement pickup system 7 cannot be mounted at an infinitely small distance from workpiece 6, due to the curved configuration of electrode 1, a residual error remains on workpiece 6, although the displacement pickup system 7 no longer measures a displacement. However, this can be easily compensated by a slight positive feedback to the variable gain amplifier 28, i.e. at the input of amplifier 28 deflection information ΔX or ΔY is permitted to appear in larger form to such an extent that the error becomes zero on workpiece 6. The arrangement of FIG. 11 is advantageously fitted as a component on guide arm 2 on either side of workpiece 6.

I claim:

1. In the art of electrical discharge machining of the type in which a workpiece (6) is cut by a wire electrode (1) which is guided between two guides (5) in a commanded guide path, including a rest or reference position    a method to correct for random, undesired deflection of the wire from the guide path comprising the steps of    commanding relative movement of the wire (1) and the workpiece (6) in said commanded guide path in accordance with command information;

said guide path having coordinate directions (x, y) perpendicular to each other;

measuring the deflection of the wire electrode from the rest position in said guide path in the two perpendicular coordinate directions by means of at least one displacement pick-up system (7), said displacement pick-up system being located around the wire electrode between the wire guides and the workpiece, and generating information indicative of the distance and direction of deflection of the wire from said rest position and hence the commanded guide path;

and substantially continuously correcting the commanded guide path of the wire electrode relative to the workpiece by additionally controlling the relative position of the electrode and the workpiece as a function of the deflection information in such a way that the deflected wire electrode remains positioned on its commanded path.

2. Method according to claim 1, wherein drive means (25, 26) are provided to relatively move the wire electrode (1) and the workpiece;

and wherein the step of correcting the guide path comprises combining the command information determining desired position coordinates and the deflection information;

and supplying said combined information to said drive means for moving the wire electrode and the workpiece relative to one another.

3. Method according to claim 1, wherein a frame structure is provided;

the wire guides (5) are mounted on the frame structure;

axially lateral deflection drive means (29, 30) are provided coupled to the wire guides (5) and capable of adjusting the wire guides relative to the frame structure;

and wherein the step of correcting the guide path comprises controlling the position of the wire guides with respect to the frame structure until the deflection information indicates that any deflection error has been reduced to zero.

4. Method according to claim 1, wherein the step of measuring the deflection of the wire electrode from the rest position in said guide path comprises positioning the displacement pick-up system spaced from the wire to provide a contactless coupling between the wire electrode (1) and said system, to generate output signals representative of deflection errors in respective coordinate direction;

and the step of correcting the commanded guide path of the wire comprises so controlling the relative position of the electrode and the workpiece that the deflection error is effectively zero or null.

5. Apparatus for electrical discharge machining of the type in which a wire electrode (1) is guided between two guides (5) in a commanded guide path which includes a rest or reference position to cut a workpiece (6), said apparatus comprising at least one displacement pick-up system (7) positioned around the wire electrode between the wire guides (5) and the workpiece (6) and measuring the deflection of the wire electrode from a rest position in two mutually perpendicular coordinate directions and providing coordinate information signals indicative of the distance and direction of deflection of the wire from the guide path;

said pick-up system comprising four test electrodes (9) arranged crossed about, and spaced from the wire electrode in a plane essentially perpendicular to the axial direction of the wire electrode;

means applying an alternating voltage between the wire electrode (1) and each of the test electrodes;

means rectifying the alternating electric current flowing between the wire electrode and the test electrodes;

absolute value former means (14) controlled by and connected to the rectifying means to provide output signals representative of deflection of the wire with respect to the test electrodes, in coordinate form;

means (25, 26) relatively moving the workpiece and the wire in respective coordinate directions;

means (27) controlling the moving means to command a predetermined movement;

and means (24, 29, 30) responsive to said output signals additionally relatively moving the wire electrode and the workpiece, in respective coordinate directions, to compensate for deflection of the wire from the commanded path.

6. Apparatus for electrical discharge machining of the type in which a wire electrode (1) is guided between two guides (5) in a commanded guide path which includes a rest or reference position to cut a workpiece (6), said apparatus comprising at least one displacement pick-up system (7) positioned around the wire electrode between the wire guides (5) and the workpiece (6) and measuring the deflection of the wire electrode from a rest position in two mutually perpendicular coordinate directions and providing coordinate information signals indicative of the degree and direction of deflection of the wire from the guide path;

said pick-up system comprising a light source and two light sensors, positioned in a plane perpendicular to the axis of the wire electrode and in relative perpendicular directions with respect to each other and so located that, if the electrode is in its commanded guide path including the rest or reference position, the electrode will cast an equally wide shadow zone on both sensor halves of the double-light sensors in both relatively mutually perpendicular directions whereas, upon deflection of the electrode from said rest position in the commanded path, the shadow zone on one sensor half, in a respective direction, is enlarged to the same extent as it is reduced on the other sensor half;

means deriving output signals from said light sensors representative of the deflection of the wire electrode from said commanded guide path, including the rest or reference position;

means (25, 26) relatively moving the wire electrode and the workpiece in respective coordinate directions;

means (27) controlling the moving means to command a predetermined movement;

and means (24; 29, 30) responsive to the output signals additionally relatively moving the wire electrode and the workpiece, in respective coordinate directions, to compensate for deflection of the wire from the commanded guide path.

7. Apparatus for electrical discharge machining of the type in which a wire electrode (1) is guided between two guides (5) in a commanded guide path which includes a rest or reference position to cut a workpiece (6), said apparatus comprising at least one displacement pick-up system (7) positioned around the wire electrode between the wire guides (5) and the workpiece (6) and measuring the deflection of the wire electrode from a rest position in two mutually perpendicular coordinate directions and providing coordinate information signals indicative of the distance and direction of deflection of the wire from the guide path;

analog computer means (21) connected to and receiving the coordinate information and processing signals representative of said coordinate information of positive and negative component values for each coordinate of the coordinate information derived from the displacement pick-up system (7);

wherein the analog computer means comprises a summing circuit (18), an inverter-amplifier (19), a divider (20) and a differentiator (17) to derive deflection error signals of positive and negative value representative of positive and negative deflection of the electrode in respective Cartesian coordinate directions, the average value of the positive and negative component in each axial direction being calculated by said summing circuit and inverter, the differentiator subtracting the average value from the positive component of the deflection signal to derive a derived signal, said derived signal being divided in the divider by the average value of the positive and negative components.

8. Apparatus according to claim 7, further including analog-digital converters (22) connected to said analog computers (21) and providing quantized signals for further processing of the output signals of the analog computers.

9. Apparatus according to claim 8, further including a read-out memory (23), the quantized output signals of the analog-digital converters (22) being fed to the address inputs of the read-only memory, each storage located of the read-only memory containing an optionally corrected value for the deflection of the wire electrode and consequently compensating for nonlinearities of the pick-up system.

10. Apparatus for electrical discharge machining of the type in which a wire electrode (1) is guided between two guides (5) in a commanded guide path which includes a rest or reference position to cut a workpiece (6), said apparatus comprising at least one displacement pick-up system (7) positioned around the wire electrode between the wire guides (5) and the workpiece (6) and measuring the deflection of the wire electrode from a rest position in two mutually perpendicular coordinate directions and providing coordinate information signals indicative of the distance and direction of deflection of the wire from the guide path;

analog computer means (21) connected to and receiving the coordinate information and processing signals representative of said coordinate information of positive and negative component values for each coordinate of the coordinate information derived from the displacement pick-up system (7);

control amplifiers for processing the position information signals as computed by said analog computers for each axial coordinate direction;

means (25, 26) relatively positioning the wire with respect to the workpiece in respective coordinate directions;

and auxiliary drive means (29, 30) effective in said coordinate directions and additionally relatively moving the wire electrode and the workpiece to so displace the wire electrode relative to the pick-up system (7) that errors resulting from deflection of the wire electrode from the commanded guide path will be reduced to zero or null.

11. Apparatus according to claim 10, wherein the auxiliary drive means (29, 30) are coupled to the wire guides (5).

12. Apparatus according to claim 10, wherein the wire guides include first and second wire guide means located, respectively, at opposite sides of the workpiece;

two pick-up systems (7) are provided, one each positioned between a respective wire guide means and the respective adjacent side of the workpiece;

and the analog computers are responsive to and controlled by the signals from the respective pick-up systems to control the relative movement of said auxiliary drive means.

13. Apparatus according to claim 12, wherein the analog computers control the auxiliary drive means associated with the wire guides of the guide means which are adjacent the respective pick-up system (7).

* * * * *